May 7, 1935.    R. R. OSBORN ET AL    2,000,666
AIRCRAFT
Filed March 19, 1930    5 Sheets-Sheet 1

INVENTORS
THEODORE P. WRIGHT AND ROBERT R. OSBORN
BY
ATTORNEY

May 7, 1935.　　　R. R. OSBORN ET AL　　　2,000,666
AIRCRAFT
Filed March 19, 1930　　　5 Sheets-Sheet 2

INVENTORS
THEODORE P. WRIGHT AND ROBERT R. OSBORN
BY
ATTORNEY

May 7, 1935.  R. R. OSBORN ET AL  2,000,666
AIRCRAFT
Filed March 19, 1930   5 Sheets-Sheet 3
FIG. 5.
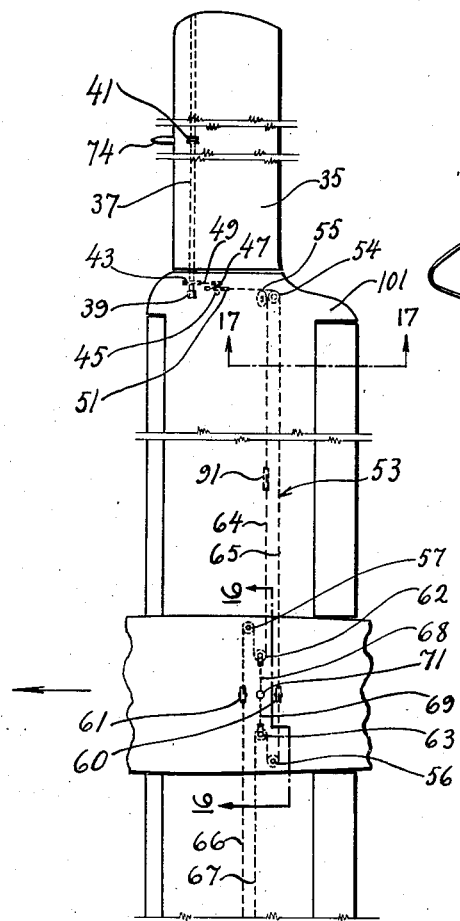
FIG. 6.
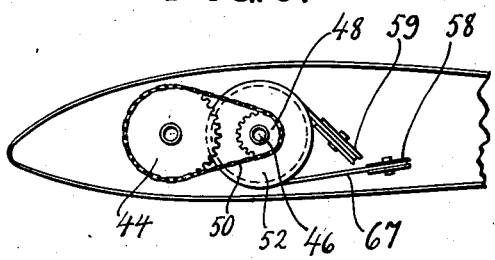
FIG. 7.
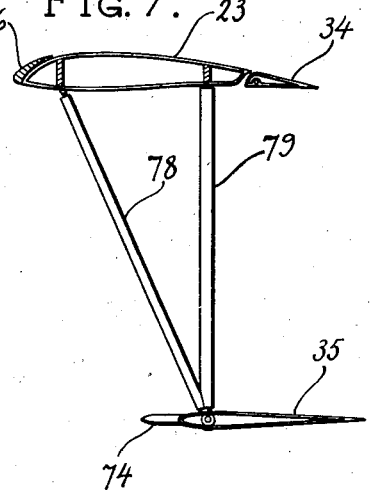
FIG. 17.
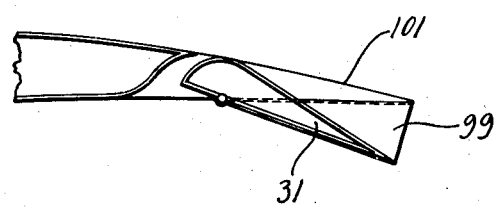
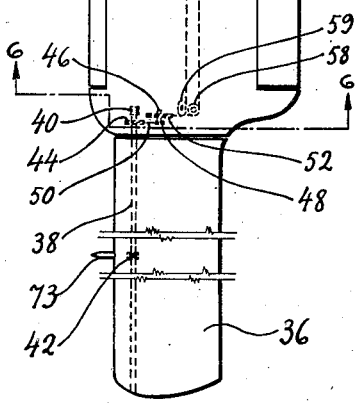
INVENTORS
THEODORE P. WRIGHT AND ROBERT R. OSBORN
BY
ATTORNEY

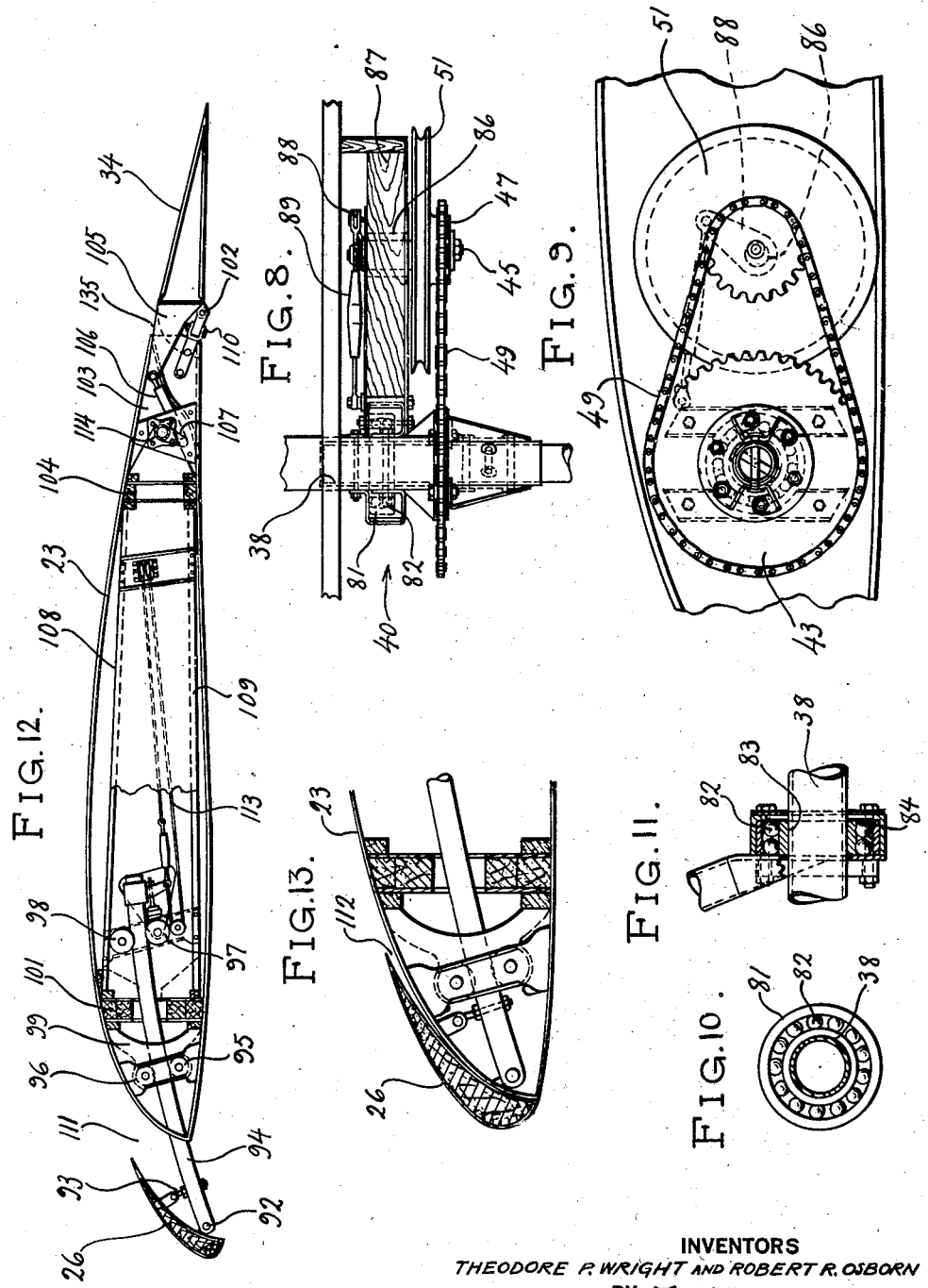

May 7, 1935. R. R. OSBORN ET AL 2,000,666
AIRCRAFT
Filed March 19, 1930 5 Sheets-Sheet 5
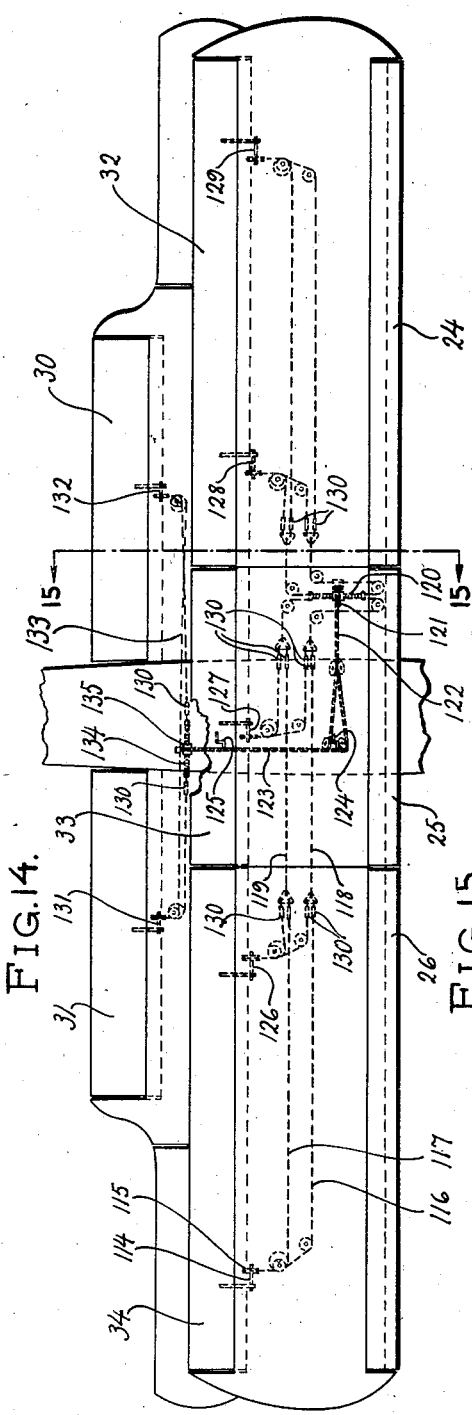
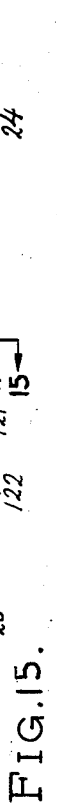
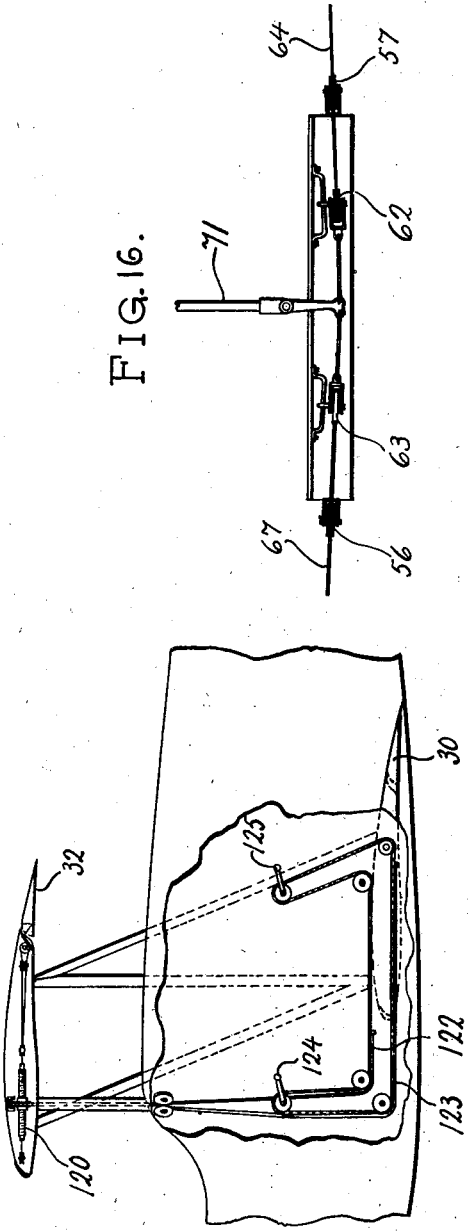
INVENTORS
THEODORE P. WRIGHT AND ROBERT R. OSBORN
BY
ATTORNEY Patented May 7, 1935

2,000,666

UNITED STATES PATENT OFFICE 2,000,666

AIRCRAFT

Robert R. Osborn, Garden City, and Theodore P. Wright, Port Washington, N. Y., assignors to Curtiss Aeroplane & Motor Company, Inc., a corporation of New York Application March 19, 1930, Serial No. 436,937

10 Claims. (Cl. 244—29)

This invention relates to aircraft and to methods of and apparatus for increasing the safety of the operation thereof. It is specifically illustrated by drawings representing features of an airplane entered in the Safe-Aircraft Competition of the Guggenheim Fund for the Promotion of Aeronautics, Inc., which competition had as its announced object "to achieve a real advance in the safety of flying through improvement in the aerodynamic characteristics of heavier-than-air craft, without sacrificing the good practical qualities of the present-day aircraft." The airplane—the Curtiss "Tanager" was the only airplane to meet the rigid requirements of that competition and was adjudged the winner of the $100,000 prize offered. In some respects, the invention comprises improvements on the device disclosed in Patent No. 1,204,380, granted to Glenn H. Curtiss on November 7, 1916.

In said patent to Curtiss there is disclosed what might be termed "floating ailerons" as distinguished from "common ailerons" or ailerons which are non-floating. By the term "floating ailerons" is meant ailerons which are positioned relative to the air stream rather than relative to the frame work of the airplane. Such ailerons are so arranged that regardless of the angle of attack of the main wings, when the ailerons are not displaced relative to each other, they are always positioned at substantially a zero angle of attack with regard to the air stream. When displaced relative to each other the pressure on the top of one aileron substantially counter-balances the pressure on the bottom of the other, and the positive angle of attack of one aileron substantially equals the negative angle of attack of the other, both angles being measured from the direction of the relative air stream. This arrangement is accomplished by providing a cable which is, in effect, attached to the top of one aileron and to the bottom of the other aileron, and a second cable, in effect, attached to the bottom of the first aileron and to the top of the second. These cables run freely over pulleys so that the ailerons are themselves free to move about their pivots on the frame work of the airplane and thus to turn so that they are normally maintained parallel wth the attacking air stream which itself serves as the force for maintaining them in this position. Means are provided for, in effect, lengthening either of the connecting cables and coincidentally, in effect, shortening the other cable for displacing the ailerons relative to each other and therefore relative to the air stream. The force of the air stream insures that during this displacement (and at all times) the pressure on the top of one aileron substantially equals the pressure on the bottom of the other and therefore that one is raised to an angle of attack above the air stream substantially equal to the angle of attack to which the other is depressed below the air stream. By this arrangement, and by reason of the fact that the relative displacement of the ailerons may be limited, the ailerons may always be maintained in the position of maximum effectiveness, and regardless of the fact that the main wings may approach to or even pass beyond the stalling angle, the ailerons may themselves never be moved so as to reach the stalling angle. Moreover, this arrangement insures that the pressure on one aileron substantially equals the pressure on the other aileron (in the opposite sense) and that the drag on one aileron is substantially equal to the drag on the other aileron, thus practically, if not entirely, eliminating undesirable yaw or turning movement of the airplane about its vertical axis, due to the action of the ailerons.

Prior to our invention, there have been suggestions of the use of floating ailerons such as those disclosed in the aforesaid patent to Curtiss; there have been suggestions of the use of ailerons positioned at other points than at the trailing edge of the wings; and there have been suggestions of the use of airplane wings, (1) having automatic, controllable or fixed slots provided adjacent to the leading edges thereof for the purpose of obtaining lift from said wings at higher angles of attack than possible for normal type wings, and (2) having flaps provided adjacent to the rear edges thereof for the purpose, at times, of increasing the lift of said wings. However, the great advantages of certain combinations of these various features have apparently never before been recognized nor has use been made thereof. Because of this lack of recognition of the value of the various combinations, floating ailerons, though known for many years, have never themselves, prior to our invention, gone into extensive practical use.

The combination in an airplane of wings having rear flaps with floating ailerons has never been proposed and produces valuable and unobvious advantages. By means of ailerons positioned at other points than at the rear of the respective wings, it is possible to use flaps over a much greater span of the wing than if the ailerons are positioned in the usual place. But it has been found that common or non-floating ailerons when positioned elsewhere than in the rear portion of a wing lose relatively more effectiveness when the wing approaches the stall than do ailerons inset in the rear portion of a wing. For this reason and others modern designers have considered that for good design it was necessary that the ailerons be positioned in the rear portion of a wing and thus that the span available for flaps be cut down. However, when floating ailerons are included in the combination, the dangerous condition occasioned by the premature loss of effectiveness of the ailerons is eliminated and it is possible thereby to position the ailerons at other positions and thereby increase the span of the flaps.

The combination of trailing edge flaps and floating ailerons allows the production of more efficient lifting surfaces than can be produced with either separately. If floating ailerons are added to an airplane of normal section without flaps, though they give increased control before, at and beyond the stalling angle, nevertheless they decrease the efficiency of the airplane because they increase the drag of the airplane without adding materially to the lift. Ordinary ailerons when in their normal position contribute their share of the lift and are, in effect, a part of the wing and therefore add nothing to the drag of the basic airfoil. Moreover, the common aileron when pulled down increases lift in the same way as a flap does when the trailing edge is pulled down. But, to use flaps to their best advantage for reducing landing or stalling speed they must be pulled down to their best lift position. It is obvious, therefore, that the common aileron cannot be made to serve efficiently as a flap, for if both ailerons were pulled down to their best lift positions there would be no increased lift available for lateral control. Therefore the aileron "flaps" must be left in neutral, or nearly so, in all conditions of flight. For this reason two conditions of lift prevail on an airplane fitted with flaps and common ailerons,—a portion of wing (usually an inner section) subtended by flaps which gives a lift at the stall of one third or more increase over the normal section at the stall, and a portion subtended by common ailerons (usually an outer section) which gives the lift of the normal section or only a small increase over it.

Thus, if we must save a portion of our flap for lateral control, and make that portion into the common aileron, then we must use greater wing area for a given weight and stalling speed. If we can use flaps for increased lift throughout the span and provide the floating ailerons as an auxiliary means of lateral control then we can use much less wing area to obtain a given stalling speed with a given weight. We have found that the drag of this reduced area plus the drag of the floating aileron plus the drag of the structure necessary to support the floating aileron is less as a total than the drag of the increased area necessary with the common aileron. This is true even if a large area of floating aileron is used which will give better control at the stall than the common aileron.

Trailing edge flaps, when pulled down, increase the lift coefficient of the wing, but may be added to a wing of ordinary section equipped with ordinary ailerons only throughout a part of the span. If trailing edge flaps are added throughout the span instead of for only the portion of the span not occupied by ailerons, the decrease in the area required to support the airplane at minimum speed decreases the drag much more than the added drag from the floating ailerons. Thus, it is possible by the combination of floating ailerons and trailing edge flaps not only to secure increased lateral control but also to produce an airplane which has a greater maximum speed for any given minimum speed than is possible by the use of either feature separately. Though floating ailerons have been proposed prior to our invention, the fact that when used without trailing edge flaps they cut down the efficiency of the airplane over the efficiency of airplanes equipped with ordinary ailerons, has prevented their practical use prior to our discovery of the advantages of the combination of floating ailerons and trailing edge flaps.

Moreover, it has been found by experiment that rear edge flaps are most effective for obtaining the slowest gliding speed or flying speed when the combined wing and flaps are completely stalled. It is evident, therefore, that when the combination wing and flap is in its most effective position the normal ailerons will also be stalled or approaching that condition and therefore relatively ineffective to control the airplane. But as pointed out above, the floating aileron is always relatively effective and therefore when used in combination with rear edge flaps safely allows the most effective use of said flaps.

The combination of slots positioned adjacent to the leading edges of the wings of an airplane and floating ailerons is another combination which has never before been suggested, though such a combination produces valuable and unobvious advantages. It is well known that the common type of aileron usually produces an undesirable yaw in rolling an airplane. When leading edge slots are used on a wing the combination reaches its maximum lift position at a much larger angle of attack than the angle at which a normal wing reaches its maximum lift. The undesirable yawing characteristic of the common type of aileron is noticeable when the airplane wings are inclined at a small angle of attack, such as may be safely attained by a wing not having slots. This yawing characteristic of the normal aileron, however, becomes so aggravated at the higher angles of attack possible with an airfoil having a leading edge slot that the use of the common aileron therewith becomes very undesirable. This is for the reason that while the lift of the section of the wing fitted with the common aileron increases substantially proportionately to the increase of the angle of attack until it nearly reaches the stall point, the drag of this section of wing increases at a continually increasing rate with the angle of attack. Therefore, it can be seen that if the full value of the slots are to be obtained, the common aileron control involves very aggravated yawing moments, increased turning tendencies and large necessary corrective rudder motions. Floating ailerons have practically no yaw throughout the flying range, and when they are used in combination with airfoils having slotted leading edges, the airplane is not subject to this aggravated condition at the high angles of attack possible with such airfoils. As stated, the aggravated yawing tendency requires the use of the rudder to offset the effect of the common ailerons.

Concededly, an airplane having airfoils of normal section cannot normally be operated at the high angles of attack possible with an airplane having airfoils equipped with slotted leading edges. An airplane equipped with slots, but having common ailerons, is with difficulty operated at said high angles of attack because, among other reasons, of the yaw and the necessary corrective rudder motions. But an airplane equipped with both the slots and the floating ailerons can be operated at said high angles of attack. Moreover, it can be operated much more easily and with less likelihood of unintentionally forcing the airplane into a dangerous attitude such as a spin by any pilot and especially by an unskilled pilot at said high angles of attack than can an airplane equipped with slots but not having floating ailerons. An airplane equipped with either feature separately cannot be operated at said high angles of attack, or can only be operated with difficulty and danger, whereas one equipped with both, in combination, can be operated without difficulty or danger.

Floating ailerons make it possible for pilots, whether skilled or unskilled, to utilize the full advantage of a wing section having leading edge slots. Common ailerons become relatively ineffective at the stall point of an airfoil fitted with leading edge slots which is usually the point at which it is desired to have the lateral control most effective. The airfoils of an airplane approach and sometimes pass the stall point in gliding at low speed and in landing, and as low speed gliding is generally required close to the ground, the loss or diminishing of lateral control becomes dangerous. With a normal wing section, and floating ailerons, it is not possible for the airplane to fly safely for any considerable length of time at extremely high angles of attack such as those exceeding the stall point of the same section if equipped with slots. With the combination of an airplane having airfoils equipped with slotted leading edges and having floating ailerons, it is possible to safely fly at angles approaching and beyond the stall point of the airfoil having the slotted leading edge, (angles which far exceed the stall point of the normal section) which result is not accomplished by an airplane equipped with either of the features acting separately. Thus, it is possible to use the full advantage of airfoils having slots only by the combination therewith of floating ailerons.

One of the objects of our invention is to increase the safety of airplanes.

A further object of our invention is the provision of an airplane capable of attaining a greater angle of attack while being safe from the dangerous characteristics accompanying the stall of the normal airplane.

A further object of our invention is to increase the lateral control of airplanes.

A further object of our invention is to provide means to maintain efficient lateral control of an airplane at points at or near the stall point of the airplane or even beyond the stall point.

A further object is to reduce spinning tendencies in airplanes.

A further object is to provide better lateral control of an airplane when the airplane wings or the airplane are fitted with devices which obtain increased lift at angles of attack greater than the stalling angle of the normal airfoil section.

A further object is the elimination of the possibility of flutter in control surfaces.

A more specific object is the elimination of the possibility of flutter in floating ailerons.

A further object is to increase the possible span of rear flaps for the main wings of an airplane.

A further object is to provide means to minimize the turning force or torque on the front wing spar caused by an auxiliary airfoil positioned in front of the main lifting airfoil of an airplane and the torque on the rear wing spar caused by a wing flap fastened adjacent to the rear end of the lifting wings of said airplane.

A further object is to provide a structure so designed that the shape of a rear slot positioned immediately in front of a movable flap attached to a fixed airfoil of an airplane will be maintained at all times substantially constant.

Further objects will be apparent from a reading of the subjoined specification and claims and from a consideration of the accompanying drawings.

In order to explain the invention more clearly, we have shown one embodiment thereof in said drawings, in which:

Fig. 5 is a diagrammatic top plan view of said airplane with the upper wing removed and with parts broken away (the arrow indicating the line of flight);

Fig. 6 is a section taken on the line 6—6 of Fig. 5 on an enlarged scale to show details of part of the aileron operating mechanism;

Fig. 7 is a section on the line 7—7 of Fig. 1 on an enlarged scale to show details of the aileron supporting struts;

Fig. 8 is a plan view on an enlarged scale of a detail of part of the aileron operating and supporting apparatus;

Fig. 9 is an elevation of the detail shown in Fig. 8;

Fig. 10 is a sectional view of the self-aligning bearing installation shown in Fig. 8;

Fig. 11 is a sectional view of the bearing installation shown in Fig. 9 and taken at right angles to Fig. 9;

Fig. 12 is a sectional view of one of the wings on an enlarged scale showing details of the auxiliary airfoil support and the rear flap support;

Fig. 13 is an enlarged sectional view of the leading edge of the wing shown in Fig. 12 but showing the auxiliary airfoil in the retracted position;

Fig. 14 is a diagrammatic plan view showing the operating mechanism for the rear wing flaps;

Fig. 15 is a diagrammatic sectional view taken at right angles to the view of Fig. 13 for further illustrating the operating mechanism of the rear flaps;

Fig. 16 is a diagrammatic view in elevation of the control stick and associated mechanism; and Fig. 17 is a section taken on the line 17—17 of Fig. 5 shown on an enlarged scale with the flap lowered and showing the details of the web which prevents the spilling of air over the edges of the flap and the consequent loss of lift.

Figure 2:
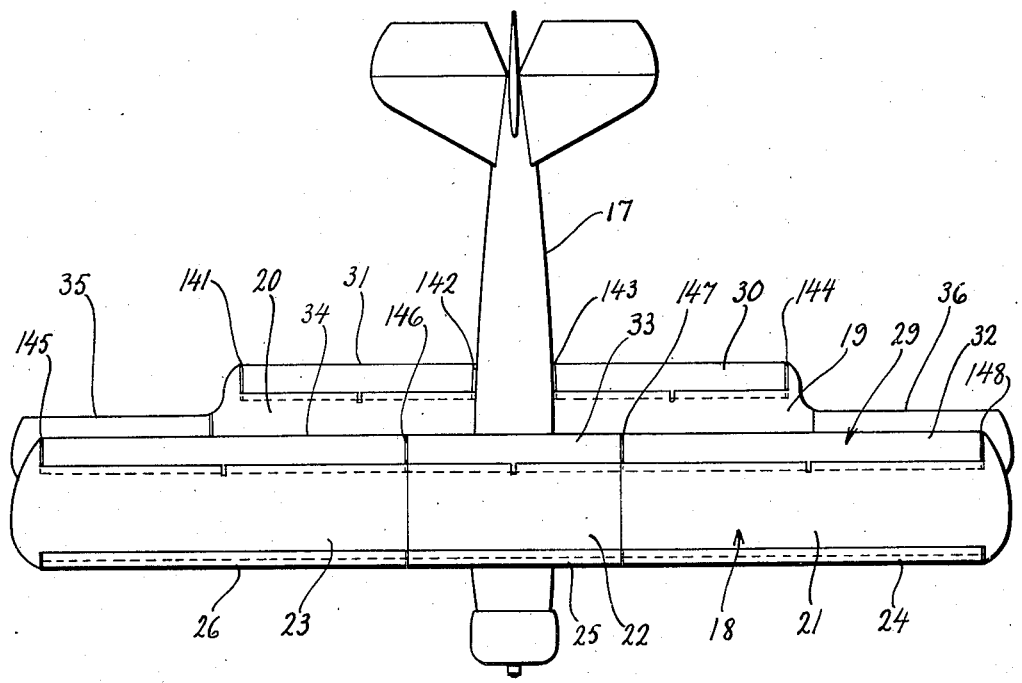
Fig. 2 is a top plan view of the airplane shown in Fig. 1.

In general, the airplane used for illustration of our invention comprises a fuselage of any suitable type, substantially normal tail surfaces, conventional engine and propeller, an upper wing and a pair of lower wings. On account of the improved design of airplanes constructed according to our invention, however, it is possible to use a rudder smaller than normal. The upper and lower wings are all provided substantially throughout their span with an auxiliary airfoil positioned in front of the leading edge thereof. This auxiliary airfoil may be moved automatically forward and backward to open or close a leading edge slot for purposes including that of increasing the angle of attack at which the wing stalls. Both the upper and lower wings also carry substantially along the entire span of the rear edge a manually controlled trailing edge flap by means of which it is possible to change the lifting characteristics of said wing. There is considerable positive overhang and attached to the lower wing and supported partially thereby and partially by means of struts fastened to the upper wing is a floating outboard aileron extending outward to a point substantially vertically beneath the outer end of the corresponding upper wing.

Referring specifically to the drawings, we have shown an airplane 16 having a fuselage 17, an upper wing 18 and lower wings 19 and 20. The upper wing 18, in the drawings, is divided into sections 21, 22 and 23. Positioned at the front of each of the sections 21, 22 and 23 are auxiliary airfoils 24, 25 and 26, respectively, and positioned in front of the wings 19 and 20 are auxiliary airfoils 27 and 28, all of these auxiliary airfoils being similar to the auxiliary airfoils described in a co-pending application of Robert R. Osborn, Serial No. 349,927. As in said co-pending application, the auxiliary airfoils 24, 25, 26, 27 and 28 are automatically movable from a rear position in which a slot adjacent to the front edge of the wing is closed to a forward position in which the slot is opened. This movement is automatically controlled by the force of the air stream, and the airfoil is so designed that the slot will open as the airplane assumes an angle of attack approaching that which would be the stalling angle thereof with said slots closed. Pivotally fastened to each of said wings 18, 19 and 20, adjacent to the rear edge thereof are the rear edge flaps 29, 30 and 31, respectively. The rear edge flap 29 comprises the sections 32, 33 and 34.

Figure 1:
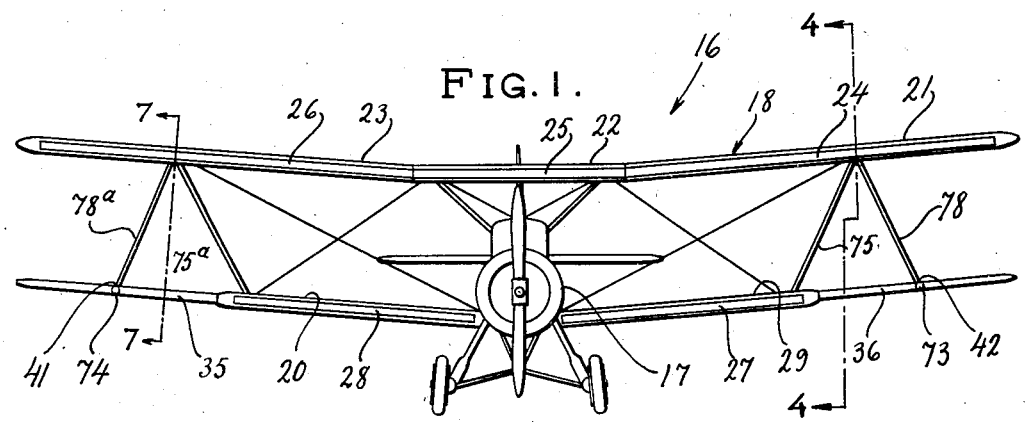
Fig. 1 is a front elevation of an airplane constructed according to our invention.
Figure 3:
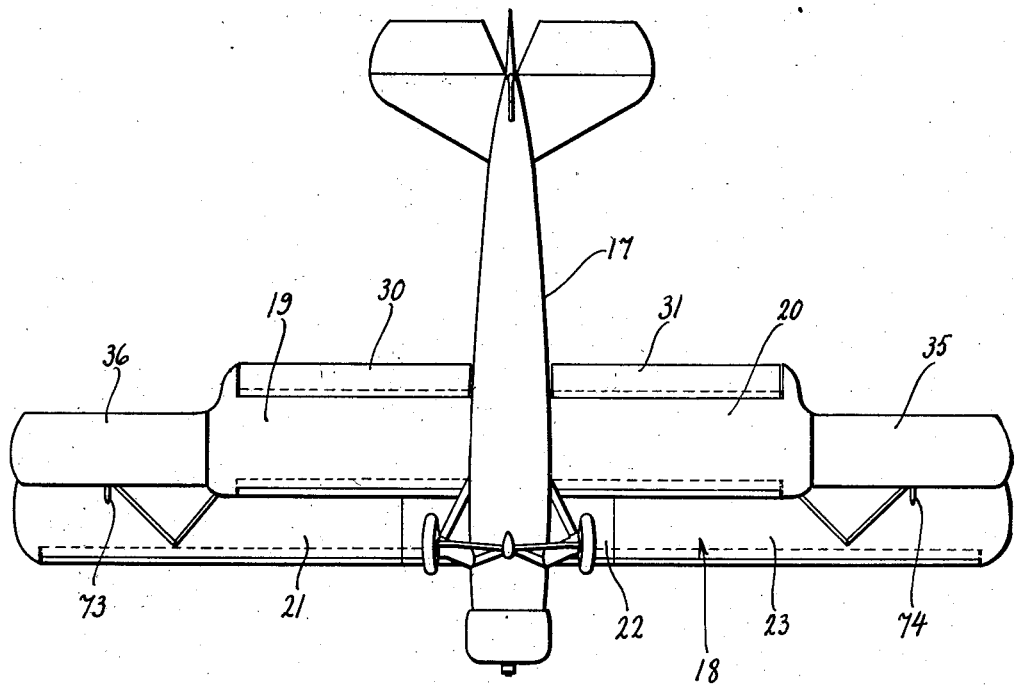
Fig. 3 is a bottom plan view of the airplane shown in Fig. 1.

"Floating ailerons" 35 and 36 are provided and are partially supported on the lower wings 19 and 20. Each of these floating ailerons is supported for substantially free rotative movement about an axis substantially perpendicular to the line of flight of the airplane and substantially in the plane of the wing. As shown clearly in Fig. 5 the floating aileron 35 is secured to a beam 37 and the floating aileron 36 is secured to a beam 38. The inner end of the beam 37 is mounted in a self-aligning bearing 39 and the inner end of the beam 38 is mounted in a self-aligning bearing 40. Self-aligning bearings 41 and 42 (see Fig. 1) are also provided for supporting said shafts at outer points. The self-aligning bearings 39 and 40 will be described in detail later, but it is to be understood that ordinary bearings may be substituted therefor if desired.

Means are provided for transmitting motion between the two ailerons 35 and 36. Secured adjacent to the inner ends of the beams 37 and 38 are sprocket wheels 43 and 44, respectively, (see Figs. 5 and 6). Positioned adjacent to the sprocket wheels 43 and 44, on stub shafts 45 and 46 are smaller sprocket wheels 47 and 48, respectively. An endless sprocket chain 49 passes over the sprocket wheels 43 and 47 and an endless sprocket chain 50 passes over the sprocket wheels 44 and 48, in order that rotative movement may be transmitted in either direction between the sprocket wheels and the shafts on which they are secured. The stub shaft 45 carries a pulley 51 substantially larger than the sprocket wheel 47 and the stub shaft 46 carries a similar pulley 52. An endless cable 53 passes around both pulleys 51 and 52 as well as over intermediate pulleys (later to be detailed), and suitable provision is made to prevent the cable from slipping on said pulleys 51 and 52 so that normally a turning movement of either of the ailerons 35 or 36 is transmitted through the cable 53 to the other aileron to cause a similar turning movement of the latter. By the provision of the stub shafts 45 and 46 and the pulleys and sprocket wheels secured thereto, it is possible to secure the same mechanical advantage as a long lever arm in the comparatively restricted space of the wing. Thereby inaccuracies in the position of the ailerons which might arise from slack in the cable 53 are minimized.

As stated above air forces are relied upon to position the ailerons relative to the air stream. It is to be noted that the axes of the beams 37 and 38 are positioned well in advance of the center line of the said ailerons so that a much larger aileron surface is presented to the air stream at the rear of the axis of each of said ailerons than in front thereof. In the airplane illustrated, the axis is positioned at about 18½% of the chord, and the center of pressure is substantially always to the rear of the axis. Thus, regardless of the angle of attack to which the airplane may be inclined, the force of the air stream tends always to cause both ailerons 35 and 36 to turn parallel to the air stream, the connecting cable freely transmitting the motion from one aileron to the other.

Means are provided to prevent the development of slack in the cable 53. The cable 53 passes (intermediate the two pulleys 51 and 52) over fixed pulleys 54, 55, 56, 57, 58, 59, 60 and 61 and over a pair of floating pulleys 62 and 63. It is to be especially noted that the pulleys 58 and 59 are positioned in advance of the pulleys 54 and 55. In the plan view the pulley 56 is positioned substantially aligned laterally of the airplane with the pulley 54 and similarly the pulley 57 is positioned substantially aligned with the pulley 58. The floating pulleys 62 and 63 are positioned substantially aligned with the pulley 55. The pulleys are of uniform width and the distance between each of the lines intersecting the pivots of the pulleys substantially equals the width of the pulleys. By this arrangement the sections 64, 65, 66 and 67 of the cable 53 are always maintained substantially parallel to each other and thereby, regardless of all movements of the floating pulleys 62 and 63, and regardless of all shifting backward or forward of the wing tip due to drag, the development of any stretch or slack in the cable 53 at any point is obviated.

We also provide means for moving the ailerons relative to each other in order to control the lateral balance of the airplane. Short cables 68 and 69 connect the floating pulleys 62 and 63 to the base of control stick 71. Movement of the base of the control stick 71 to the left causes an effective shortening of the sections 65 and 67 of the cable 53 and an effective lengthening of the sections 64 and 66. Inasmuch as the section 65 passes over the upper part of the pulley 51 and the section 67 passes under the lower part of the pulley 52, this causes a relative turning movement of the ailerons 35 and 36 to turn the aileron 35 to a positive angle of attack and to turn the aileron 36 to a negative angle of attack. It is to be noted that these angles of attack bear no relation to the angles of attack of the main lifting planes of the airplane, but are positioned wholly relative to the attacking air stream. In their preferred embodiment the ailerons are of symmetrical section and therefore the positive angle of one should substantially equal the negative angle of the other, although it is possible on account of unequal distribution of pressures, that the positive angle of one aileron may not equal exactly the negative angle of the other. However, the ailerons will turn to such a position that the up force on one aileron will substantially equal the down force on the other. This equalization of forces is allowed by reason of the fact that the cable 53 is free to run on all of the pulleys except pulleys 51 and 52 regardless of the position of the stick 71. It is by reason of the fact that the ailerons are positioned relative to the air stream only, and are not dependent upon the angle of attack of the airplane, that effective lateral control is possible at, or even beyond, the stalling point of the airplane, as well as in level flying. Moreover, as a result of the equalization of pressures just pointed out, the turning force on the airplane about its vertical axis, and the yaw due to the ailerons, is practically, if not wholly, eliminated.

We so construct these floating ailerons that dangerous "flutter" is also eliminated. To most clearly explain what is meant by dangerous flutter, it is thought that an explanation of the cause thereof will be proper. For instance, consider the case of wings fitted with ailerons, the ailerons having their centers of gravity at points some distance aft of the hinge lines. If there is some air disturbance which causes one of these wings, say the left one, to be thrown up, the wing will have a tendency to carry the aileron with it. However, the aileron is attached only at the hinge and as most of the weight is aft of the hinge, the aft portion of the aileron will tend to lag behind the main wing as far as allowed by the stretch or slack in the aileron control system. The wing and aileron will then be rising because of the disturbing gust, and it will be noted that the aileron will be in the control position which will also tend to cause the wing to rise. For this reason, the wing will rise farther before coming to rest than is accountable for by the amount of the disturbance. Eventually, however, the rise of the wing will be checked by the inherent stability of the airplane and thereafter there will be a tendency for the wing to return downward to its normal position. When the main wing does come to rest in the upper position, the aft portion of the aileron will tend to keep on rising because of the fact that it has inertia and the weight is aft of the hinge line. Therefore, it rotates about its hinges to an up position, tending to drive the wing down again. This process will continue until one of two things will happen. The most probable occurrence from this condition is that the wing will oscillate a few times before coming to rest finally, each succeeding oscillation being smaller than the one preceding it. However, any body having its center of gravity at any distance from an axis of rotation will have a natural pendulum period about that axis, and if the period of the oscillations in the wing caused by the disturbance should synchronize with the period of the oscillations of the aileron about its hinge line, the oscillations will become increasingly large until some dangerous structural failure occurs. It is this latter kind of oscillation which we are especially anxious to guard against and to which we refer when we speak of dangerous flutter.

It may thus be seen that it is very important that "flutter" of the ailerons should be eliminated. When the control stick is held stationary, floating ailerons are free to move relative to the airplane and are only maintained in position relative to each other. In consequence of their freedom of movement they may oscillate regardless of the position and/or lack of movement of the control stick. As explained above, control surfaces having their centers of gravity in back of their axes are especially susceptible to flutter. We provide that while the larger part of the surface of the ailerons 35 and 36 is positioned rearward from the axes thereof for purposes previously stated, the ailerons may be exactly (or nearly so) balanced, as to weight about said axis. Or, if desired, a slight additional weight may be provided in front of said axes. The provision of this balance is accomplished by an arrangement of the frame work of the aileron so that the heavier portions of the structure which bear the strains acting upon the ailerons, are positioned in the nose, while the rear portion of the aileron is made of as light construction as is consistent with safety. In addition, we provide metal weights 73 and 74 fastened to the leading edge of the ailerons 36 and 35, respectively. These weights should be of stream line shape and preferably should extend forward a considerable distance from the axes of the ailerons, in order to secure the advantage due to the longer lever arm effect. By causing the ailerons to be balanced with the center of gravity either on or forward of said axis, we secure the elimination of the objectionable oscillation or "flutter". Furthermore, by providing additional weight in front of said axis, we can provide a simple but effective stabilizing device capable of tending to right the airplane quickly and automatically should one wing thereof become suddenly depressed or elevated due to a downward or an upward air current. For example, should the right wing move upward, the right aileron would move with it, but said aileron being of the floating type, would be capable of pivoting about its axis. The forward part of the aileron being heavier would tend to lag behind the pivot due to inertia within the limits allowed by the stretch or slack of the control system, which lag would automatically shift both right and left ailerons to the proper displaced position to tend to stop the oscillation and to lower the right wing and raise the left one. Similarly, on the return downward movement of the wing, the lag of the aileron serves to prevent too great a depression thereof. It is thus clear that this automatic action of the ailerons when combined with the natural stability of the airplane serves rapidly to damp all oscillations. The principle of the invention described above relative to ailerons is of course applicable to other control surfaces. Thus, a pivoted surface similar to the floating ailerons, whether connected with other surfaces or not and constructed with the center of gravity ahead of the pivot can be made to serve as an excellent stabilizer about any axis of an airplane. Therefore, in the appended claims, we intend to cover stabilizing surfaces of any nature constructed according to our invention and arranged to pivot about any axis of the airplane.

Figure 4:
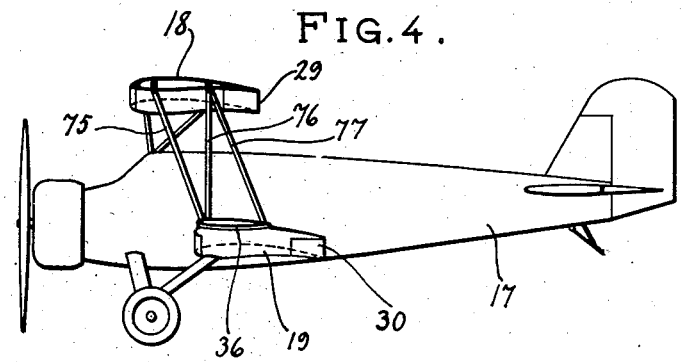
Fig. 4 is a sectional view of the airplane shown in Fig. 1 taken substantially on the line 4—4 thereof.

As stated above, the shafts 37 and 38 may be mounted, if desired, in the self-aligning bearings 39 and 40, respectively, and in outer bearings (also self-aligning) positioned at the points 41 and 42. Struts are arranged to support these bearings. Three struts arranged in N-shaped formation, such as those shown at 75, 76 and 77 of Fig. 4 are provided on each side of the airplane and aid in bracing the upper wing 18 and the lower wings 19 and 20. Each junction of the two forward struts, such as the junction of the struts 75 and 76, is connected to its associated lower wing which in turn supports one of the self-aligning bearings 39 or 40. On each side of the airplane there are also arranged a pair of V-shaped struts such as those shown at 78 and 79 in Fig. 7. The strut 78 is connected to the upper wing at substantially the same point as the strut 75, and the strut 79 is connected at substantially the same point as the struts 76 and 77. The lower junction and intersection of the two struts 78 and 79 is connected directly to a fitting which houses the outer bearing at 42 for the shaft 38. Similarly, struts 78ª and a strut (not shown) corresponding to 79 are connected to the bearing 41 for the shaft 37.

The self-aligning bearings 39, 40, 41 and 42 are alike and a detailed description of one will suffice. As shown in Fig. 8 the bearing 40 for the beam 38 comprises a housing 81, and a plurality of ball bearings 82 contained within said housing (as shown in Figs. 10 and 11) in a pair of concentric circles. A bushing 83 is provided to surround the shaft 38 and to bear against the double ring of the ball bearing 82. As may be clearly seen at 84, the outer race for the ball bearing 82 is formed as an arc so that it is possible not only to rotate the beam 38 about its longitudinal axis, but also it is possible to rotate it for a short distance about a vertical line passing through said self-aligning bearing as an axis. By this provision, it is possible that the outer ends of ailerons 35 and 36 may move forward and backward slightly when such action is permitted by the struts 78, 79, 78ª and the strut (not shown) associated with 78ª and corresponding to the strut 79, without imposing by said movement any great strain upon the bearings 39 and 40 or the shaft of the aileron. This insures that the loads upon the ailerons 35 and 36, and their supporting shafts 37 and 38, shall be carried by the mentioned struts and by the N struts, one set of which is designated as 75, 76 and 77. It also allows adjustment of the ailerons 35 and 36 forward or backward if desired. Suitable collars are provided to prevent the endwise movement between the beams 37 and 38 and their bearings.

Means are provided to tighten or loosen the sprocket chains 49 and 50 and to maintain said chains taut regardless of the adjustment forward or backward of the ailerons 35 and 36. This means is duplicated on both sides of the airplane and therefore a description of the means associated with the chain 49 will be sufficient to illustrate both. As shown in Fig. 8 the sprocket wheel 47 is carried on the stub shaft 45. The stub shaft 45 is actually a part of a bolt which has an eccentric enlargement 86. The enlarged portion is mounted for rotation eccentrically of the shaft 45 in a support 87 secured to the wing structure, and said enlarged portion carries a lever arm 88, the position of which lever arm is adjusted by means of a turnbuckle 89 having its opposite end secured to a fixed part of the wing structure. Thus, by operation of the turnbuckle 89, the lever arm 88 and the bolt may be rotated. Thereby the shaft 45 may be moved toward or away from the shaft 38 and the sprocket chain 49 connecting the sprocket wheels 43 and 47 may be maintained taut. As shown in Fig. 5 a turnbuckle 91 may be inserted at any convenient point in the cable 53 and may be operated in the usual manner to maintain said cable taut or permit detachment of cables to permit wings to be disassembled.

We also provide tracks (see Fig. 16) for the floating pulleys 62 and 63 to keep them from sagging. These tracks are so arranged, and all of the fixed pulleys are so arranged, that the floating pulleys and fixed pulleys are maintained in positions relative to each other substantially corresponding to the angle of dihedral of the wings with which said pulleys are associated.

As previously stated, each of the wings 18, 19 and 20 is provided with one or more auxiliary airfoils. These airfoils are mounted in front of the leading edge of the main wing section and are automatically movable from a position adjacent to said leading edge to a position substantially in advance thereof so that a slot may be provided adjacent to the front of the wing to admit of the passage of air therethrough and to provide for the maintenance of lift on said airfoil past the usual stall or burble point. Also, as previously stated, we provide manually operated flaps adjacent to the rear edge of each of the wings, which said flaps are adapted to be moved from positions in which they are substantially a continuation of the main wing toward the rear thereof, to positions in which they are turned downward or upward to change the camber of the wing. The expression "change the camber" is used broadly herein and is intended to include any modification of the wing to increase or decrease the departure of the curve of the wing from the chord regardless of whether during the operation the curve of the airfoil be maintained substantially smooth or not.

The improved means for mounting the auxiliary airfoils and the rear flaps on their associated wings so that the turning stresses of each may not be borne by its associated spar alone will now be described in detail. All of the auxiliary airfoils and all of the flaps are similarly mounted and a description of the mounting of one of each will illustrate all. As shown clearly in Fig. 12 the auxiliary airfoil 26 is adjustably secured as at 92 and 93 to an arcuate support arm 94 arranged to slide substantially longitudinally of the wing between roller bearings 95, 96, 97 and 98. The roller bearings 95, 96, 97 and 98 are secured in brackets such as 99, which brackets are in turn secured to the forward lateral spar 101 of said wing. The rear flap 34 is pivotally mounted as at 102 on a bracket 103 secured to the rear spar 104, and a forwardly extended arm 105, attached to said flap 34, is adjustably secured, as by an adjustable length link 106 to a lever arm 107 also pivoted on said bracket 103. Means are provided, which will be hereinafter described more in detail, for turning the lever arm 107 and thus moving the flap 34 from its normal position to a position in which it is turned down relative to the wing. Additional pivots such as 110 may also be provided in the mounting to prevent binding.

Most of the time the air forces act upward upon said flap but the forces are especially large when the flap is down. These forces cause the flap to tend to turn the spar 104 in a counter-clockwise direction as seen in Fig. 12. The air forces acting on the auxiliary airfoil may act upward and tend to cause it to turn in a clockwise direction as seen in Fig. 12. Thus the spars 101 and 104 may be urged to turn in opposite directions. We provide compression and tension bracing members 108 and 109 to transmit the torque of one spar to the other. These members transmit the compression loads to and from the spars by their contact therewith. They are suitably fastened to the spars so that they also transmit tension loads. For example blocks forming part of the contour of the wing may be secured to the upper and lower faces of the spars as by means of nails and glue. Wedge shaped blocks may be similarly secured to said contour blocks and to the members 108 and 109. Thus the loads imposed by the air forces upon the auxiliary airfoil 26 when in its forward position tend to counter-balance the loads imposed upon the flap 34, when in its down position. Even if the loads were acting downward on the front auxiliary airfoils and upward on the rear flap, or vice versa, though the forces would not tend to counter-balance each other, yet the bracing members so transmit the loads as to remove the torsion from the two spars separately and carry it by means of the composite structure including the spars, the ribs and the bracing members.

As previously stated, the auxiliary airfoil 26 is automatically moved from one to the other of its forward and rearward positions by the air forces acting upon it. When the main wing is inclined at relatively low angles of attack the air forces acting on the forward part of the airfoil 26 urge it backward against the main part of the wing and thus maintain the slot closed. But when the main wing is inclined at large angles of attack, the air stream acting underneath the auxiliary airfoil 26 causes additional lift in an upward and forward direction to be exerted upon the auxiliary airfoil and causes it to move outward from the main wing. As soon as the airfoil moves outward it opens the slot 111, thus causing the air stream to follow the upper surface of the wing, and preventing burbling. We have found it advantageous to so form the surfaces that when the auxiliary airfoil is in the position shown in Fig. 13 there is a small space 112 between the auxiliary airfoil 26 and the main lifting surface, adjacent the top of the wing, while the portions adjacent the bottom thereof are in contact. The space may be larger at the top and gradually narrow toward the bottom. The provision of this space insures that while the airplane is traveling at relatively low angles of attack a suction will be created by the air flow past the upper entrance to said space and that this suction will hold the auxiliary airfoil 26 firmly against the main surface of the wing. Were this space not provided, the auxiliary airfoil would move forward too soon and thus would slow down the airplane at normal angles of flight. As the angle of attack increases, the pressure underneath the nose increases until it reaches a point where it overbalances the suction and causes the auxiliary airfoil to move forward. By adjustment of the angle between the chord of the auxiliary wing and the chord of the main wing and by adjusting the height of the auxiliary wing relative to the main wing, we may regulate the exact angle at which the slot will open. We so design the main airfoil and the auxiliary airfoil that, when combined and positioned as shown in Fig. 13, they form in effect a single airfoil of a shape of maximum efficiency, as well as one in which the auxiliary airfoil stays within the boundaries of the basic airfoil. It may be seen that if the combined airfoil were designed for maximum efficiency when the airfoil 26 is positioned tight against the main airfoil and if then the auxiliary airfoil were adjusted forward to form the space 112 the main airfoil would then be varied from the most desirable form.

As stated, the movement of the auxiliary airfoil 24 is altogether automatic and depends upon the action of the air stream. It is controlled by the angle at which the air stream is inclined to the wing and thus is controlled by the angle of attack of the main wing. Thus, so long as the angle of attack is well below the stalling angle of the main wing, the slot remains closed and maximum speed may be obtained from the airfoil. However, when the main wing approaches the stalling angle the air forces cause the auxiliary airfoil 26 to move forward to open the slot and thus greatly increase the angle at which the combined wing will stall, increasing the safety of the airplane and at the same time decreasing the speed thereof. The cable 113 is similar to the cable disclosed in the co-pending application of Robert R. Osborn, Serial No. 349,927, and is provided merely for the purpose of maintaining the different ends of the auxiliary airfoil 24 in parallel relation so that the airfoil 24 will not become jammed due to one end opening before the other.

As previously stated, the rear flaps are manually controlled. The lever arm 107 is carried on a shaft such as the shaft 114 shown in Fig. 14, and operated through a pulley 115. Operation of the lever arm moves the link 106 (see Fig. 12), and thus turns the arm 105 which is formed with the flap 34. Cables such as 116 and 117 are provided to turn the pulley 115. These cables are connected to other cables 118 and 119 and lead to a worm screw 120. The worm screw 120 is operated by a worm wheel 121 driven by a sprocket chain 122. The worm wheel 121 is held from moving by bearings, and screw 120 is held from turning by any suitable means. Thus when worm wheel 121 is rotated, screw 120 translates thru it. The sprocket chain 122 is connected to a second sprocket chain 123 in turn driven by either one of the hand cranks 124 or 125. Additional units 126, 127, 128 and 129 each composed of levers such as 107, shafts such as 114, and pulleys such as 115, are provided for operating other parts of the flaps 32, 33 and 34. Similar units 131 and 132 are provided for the lower wing flaps 30 and 31. These units were connected through cables such as 133 to a worm 134 operated by a worm wheel 135 and driven by the sprocket chain 123. Suitable pulleys should be provided at convenient points, and turnbuckles 130 should be provided for adjusting any section of the cables.

We provide rear slots positioned in front of each of the rear flaps. These slots are designed to be of fixed contour regardless of the position of the flap. As shown in Fig. 12 the forward edge of the rear flap 34 is formed arcuately concentric with the pivot 102 of the flap 34 so that regardless of the change of position of the flap 34. the shape of the slot 135 remains unchanged.

Where airfoils are provided movable relative to other airfoils such as the rear flaps 30, 31, 32, 33 and 34, which airfoils are movable relative to their respective wings, and such as the ordinary or common type of ailerons (which are not used on our invention, but which are also movable relative to their respective wings), movement of the surfaces often leaves a gap at each end thereof over which the air spills, forms eddies and causes large "end losses." Also, where there are two or more of these surfaces movable different distances relative to each other or movable at different angles relative to each other, gaps are sometimes left over which similar losses occur. We provide means to minimize these losses and thereby increase the efficiency of the airplane. At each of the junction points 141, 142, 143, 144, 145, 146, 147 and 148 which mark the junctions between the various sections of the flaps 29, and between the ends of the flaps 29, 30 and 31 and the fixed surfaces, we have provided means such as that shown in Fig. 17 for preventing these "end losses." Cloth webs such as that shown at 99 are joined to both of the two relatively movable surfaces. For instance, the cloth web 99 is joined to the fixed portion 101 of the lower wing 20 and to the outer edge of the flap 31. This cloth web is triangular in shape and of sufficient width that when the flap is pulled down to its maximum deflection the web shall be stretched taut, but when the flap is raised to a position in which it forms a substantial continuation of the wing, the web folds up as the folds of an accordion. Thus provision is made to prevent the escape of air through the gaps left by relative movement of the flaps and the fixed part of the wings and through the gaps left by the differential movement of various sections of the flaps due to the dihedral angle.

In the operation of the airplane which is described herein and which is constructed according to our invention, the pilot controls the airplane substantially in the usual manner. However, when he desires to fly the airplane at relatively slow speeds he may operate one of the hand cranks 124—125 to move the trailing edge flaps to their lower position and thus increase the lift and allow the flight of the airplane at lower speeds than would otherwise be possible. Should the airplane approach the normal stalling angle, the auxiliary airfoils 24, 25, 26, 27 and 28 will automatically move forward to a position in which the slots are open and thus maintain ample lift upon the wings of the airplane even when flying at angles far beyond the normal stalling angle. In the control of the airplane, the lateral balance is maintained through the floating ailerons 35 and 36. As previously described these ailerons are normally positioned parallel to the air stream and so regardless of the angle of attack of the main wings, or of the position of the auxiliary airfoils 24, 25, 26, 27 and 28, or of the position of the rear flaps 29, 30 and 31, the ailerons 35 and 36 are always at their position of maximum effectiveness. The ailerons may be moved relative to each other by the stick 71. This movement of the ailerons relative to each other is effective to cause a greater lift on one side of the airplane than on the other and thus is effective to control the lateral balance of the airplane.

While we have illustrated our invention as applied to a bi-plane airplane, it may, of course, be applied to aircraft having only one wing and to aircraft having more than two wings. The auxiliary airfoils have been illustrated as formed in separate sections and the trailing edge flaps have also been illustrated as formed in sections. It is clear, however, that without departing from the spirit and scope of the invention, the auxiliary airfoils and/or trailing edge flaps might be formed in single sections. Therefore, in the appended claims we desire the terms "wing", "auxiliary airfoil", "slot", and "trailing edge flap" to be understood in their collective sense as meaning one or more of each, respectively.

The term "airplane" as used in the appended claims is intended to cover any and all forms of aircraft having either fixed or movable wing surfaces for sustaining them.

It is to be understood that the above described embodiment of the invention is for the purpose of illustration only and various changes may be made therein without departing from the spirit and scope of the invention.

We claim as our invention:

1. In an airplane, in combination, a rigid wing, means carried by and forming with said rigid wing a unit lifting surface capable of operation at higher effective angles of attack, without a falling off in lift, than is possible with said rigid wing alone, ailerons for controlling said airplane carried by and having transversely extending pivot axes disposed without the confines of said unit lifting surface, said ailerons, when neutral, being so positioned with respect to said unit lifting surface that each, regardless of the effective angle of attack of said unit lifting surface, occupies a position in substantial parallelism with the attacking air stream and is subject to substantially equal air pressures on its upper and lower surfaces, and means for operating said ailerons from the pilot's space within the airplane.

2. In an airplane, in combination, a rigid wing, a trailing edge flap substantially coextensive with and carried by said rigid wing and forming with said rigid wing a unit lifting surface capable of operation at higher effective angles of attack, without a falling off in lift, than is possible with said rigid wing alone, ailerons for controlling said airplane carried by and having transversely extending pivot axes disposed without the confines of said unit lifting surface, said ailerons, when neutral, being so positioned with respect to said unit lifting surface that each, regardless of the effective angle of attack of said unit lifting surface, occupies a position in substantial parallelism with the attacking air stream and is subject to substantially equal air pressures on its upper and lower surfaces, and means for operating either or both said ailerons and/or said trailing edge flap from the pilot's space within the airplane.

3. In an airplane, in combination, a rigid wing, a trailing edge flap substantially coextensive with said rigid wing, means carried by said rigid wing forming therewith and with said trailing edge flap a unit lifting surface having formed therein, adjacent to its leading edge, a substantially coextensive slot, said unit lifting surface by reason of said slot and said trailing edge flap being capable of operation at materially higher effective angles of attack, without a falling off in lift, than is possible with either said rigid wing and said trailing edge flap or said rigid wing and said slot alone, ailerons for controlling said airplane carried by and having transversely extending pivot axes disposed without the confines of said unit lifting surface, said ailerons, when neutral, being so positioned with respect to said unit lifting surface that each, regardless of the effective angle of attack of said unit lifting surface, occupies a position in substantial parallelism with the attacking air stream and is subject to substantially equal air pressures on its upper and lower surfaces, and means for operating said ailerons from the pilot's space within the airplane.

4. In an airplane, in combination, a rigid wing, means carried by and forming with said rigid wing a unit lifting surface capable of operation at higher effective angles of attack, without a falling off in lift, than is possible with said rigid wing alone, ailerons for controlling said airplane carried by and disposed wholly beyond and in place of the outer ends of said unit lifting surface, said ailerons, when neutral, being so positioned with respect to said unit lifting surface that each regardless of the effective angle of attack of said unit lifting surface, occupies a position in substantial parallelism with the attacking air stream and is subject to substantially equal air pressures on its upper and lower surfaces, and means for operating said ailerons from the pilot's space within the airplane.

5. In an airplane, in combination, a rigid wing, a trailing edge flap substantially coextensive with and carried by said rigid wing and forming with said rigid wing a unit lifting surface capable of operation at higher effective angles of attack, without a falling off in lift, than is possible with said rigid wing alone, ailerons for controlling said airplane carried by and disposed wholly beyond and in the plane of the outer ends of said unit lifting surface, said ailerons, when neutral, being so positioned with respect to said unit lifting surface that each, regardless of the effective angle of attack of said unit lifting surface, occupies a position in substantial parallelism with the attacking air stream and is subject to substantially equal air pressures on its upper and lower surfaces, and means for operating either or both said ailerons and/or said trailing edge flap from the pilot's space within the airplane.

6. In an airplane, in combination, a rigid wing, a trailing edge flap substantially coextensive with said rigid wing, means carried by said rigid wing forming therewith and with said trailing edge flap a unit lifting surface having formed therein, adjacent to its leading edge, a substantially coextensive slot, said unit lifting surface by reason of said slot and said trailing edge flap being capable of operation at materially higher effective angles of attack, without a falling off in lift, than is possible with either said rigid wing and said trailing edge flap or said rigid wing and said slot alone, ailerons for controlling said airplane carried by and disposed wholly beyond and in the plane of the outer ends of said unit lifting surface, said ailerons, when neutral, being so positioned with respect to said unit lifting surface that each, regardless of the effective angle of attack of said unit lifting surface, occupies a position in substantial parallelism with the attacking air stream and is subject to substantially equal air pressures on its upper and lower surfaces, and means for operating either or both said ailerons and/or said trailing edge flap from the pilot's space within the airplane.

7. In an airplane, in combination, a main wing and an auxiliary wing of a lesser angle of incidence than that of the main wing and located forwardly thereof, an aileron connected to and extending wholly beyond the outer tip of and in the plane of said main wing, and control means for operating said aileron, said aileron being capable of free movement about its axis independently of said control means.

8. An airplane comprising an upper wing, a lower wing, a control surface pivotally mounted on said airplane, a shaft about which said control surface is pivoted, means comprising a bearing for supporting said shaft on the lower wing, an additional bearing for said shaft positioned outward from said lower wing, and a strut for supporting said last named bearing and connecting it to the upper wing.

9. In an airplane, a main wing, a front spar and a rear spar therefor, ribs extending from one to the other of the spars, an auxiliary airfoil positioned in front of said wing and adapted to be moved forward and backward automatically to open and close a leading edge slot, a trailing edge flap mounted adjacent to the rear edge of said main wing, means for transmitting the loads imposed upon said auxiliary airfoil to the front spar of said wing, means for transmitting the loads imposed upon said rear edge flap to the rear spar of said main wing, and means other than said ribs for causing the torsional loads imposed upon said front spar by the auxiliary airfoil to be transmitted to the rear spar said last named means comprising a pair of bracing members one connecting the upper parts of said spars and one connecting the lower parts thereof for minimizing the torsional strains in said spars.

10. In an airplane, a control surface, a sprocket wheel connected to said control surface for operating the same, a second sprocket wheel, a sprocket chain passing over said wheels, means for turning said second wheel, a shaft for said second wheel having an eccentric enlargement, a support in which said enlargement is adapted to rotate, and means for rotating said enlargement, whereby the second wheel may be moved toward and away from the first wheel.

ROBERT R. OSBORN.
THEODORE P. WRIGHT.